T. J. POWERS, Dec'd.
Anna Powers, Executrix.
PAPER-BOXES.
No. 7,570. Reissued March 27, 1877
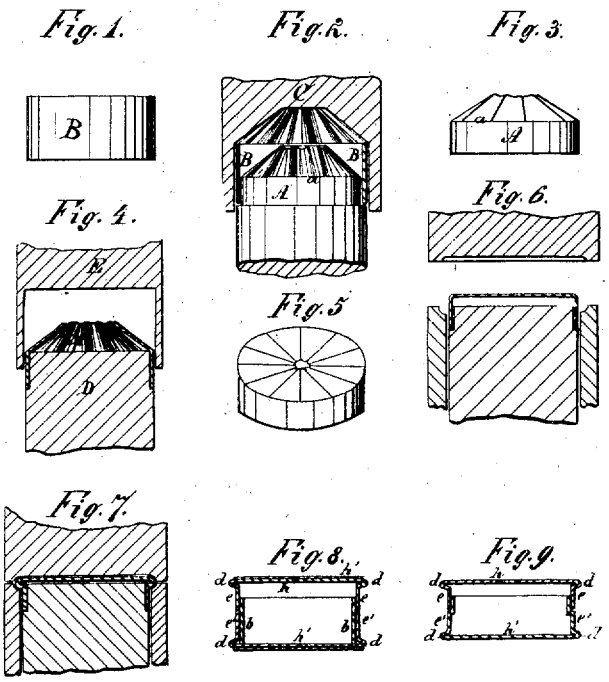
Witnesses:
Theodore L. Foster.
C. E. Clark.
Inventor:
Anna Powers.
Executrix of T. J. Powers dec'd.
By J. P. Fitch
Her atty.

BEST AVAILABLE COPY

UNITED STATES PATENT OFFICE

ANNA POWERS, OF NEW YORK, N. Y., EXECUTRIX OF TIMOTHY J. POWERS, DECEASED.

IMPROVEMENT IN PAPER BOXES

Specification forming part of Letters Patent No. 156,591, dated November 3, 1874; reissue No. 6,618, dated August 24, 1875; reissue No. 7,570, dated March 27, 1877; application filed January 27, 1877.

*To all whom it may concern:*

Be it known that TIMOTHY J. POWERS, deceased, late of the city of New York, county and State of New York, did invent a Paper Box, the same being a new manufacture, of which the following is a specification:

This invention relates to pasteboard boxes; and consists in a box the body of which is formed of a cylinder of paper, one end of which is folded inward, and pressed without being cut, and covered with a disk of paper to form the bottom. It consists, also, in a box thus constructed and provided with annular projecting rims at the top and bottom, one or both, that are formed by bending and folding the pasteboard at the angles of the sides and top and bottom, the top (or bottom,) the side, and the projecting flange of each part of the box thus being formed of a single piece of pasteboard.

In the accompanying drawings there are shown both a box embodying this invention and the tools by which the same is made.

The method of fabricating this new box which has been found most convenient is to take common paper, cover one side thinly with paste, and form it into a tube or cylinder, having walls of sufficient thickness, by winding it around a mandrel of suitable size, corresponding to the diameter of the box designed to be made. A side elevation of such a cylinder is seen at Figure 1. This cylinder is then placed upon a die (shown in elevation at A, Fig. 2) having a shoulder to support the lower edge of the cylinder, (shown in section,) and the upper end, above the line *a*, being made conical, and grooved or fluted to match the die A, fits down over the latter. It is evident that when the die C is pressed down upon the paper cylinder its upper portion above the line *a* will be folded inward, and made to assume the form represented by Fig. 3. It is then transferred to another die, D, with a plane surface at the upper end, and also a shoulder to support the paper cylinder, as shown in section in Fig. 4. By pressing the upper plane-faced die E down upon the lower die D the folding process will be completed, and, a severe pressure being applied, a smooth plane top will be formed, as shown in Fig. 5. Then, by pasting a disk of paper, *h'*, over the face of the closed end, both inside the box and out, the folds and the aperture that may be left at the center will be entirely closed. This constitutes one part, top or bottom, as the case may be, of the intended box. A similar closed cylinder may be made for the other part of the box.

Paper boxes, used for the purposes for which that herein described is designed, are generally made with an annular flange or rim projecting beyond the body at the top and bottom, which is formed by cutting the paper disk, constituting the top and bottom, somewhat larger in diameter than is the diameter of the body, to which the top or body is attached by being pasted to the longitudinally-straight edge of the body, or by forming an outwardly-projecting flange on the body by stamping, pressing, or spurring, and then attaching with paste, or equivalent, the head or bottom to this flange. In either case there is a seam between the head or bottom and body of the box or cover. The said projecting rim is formed without a seam between the head or bottom and the body of the box or cover, the paper being continuous from the body around the bend forming the flange, the flange being formed by bending and folding the same piece of paper that forms the body, and goes to form the head or bottom, over upon itself as shown at *d*, in Figs. 8 and 9. The tools by which this projecting flange may be made are shown in Figs. 6 and 7. They consist of a die, *k*, a supporting-punch, *l*, and a header, *m*. They do not differ essentially in their construction and mode of operation from those ordinarily employed in forming the flanged-headed metallic cartridge-cases, and the flange or rim itself of said box is formed in a manner substantially similar to the flange of a cartridge-head.

I do not, of course, intend to broadly claim as new such a flange, formed as described, at the end of a tube or hollow cylinder, whether the tube is made of metal or paper. But I intend to limit my claim at this point to a paper box, when said box has projecting flanges on the bottom and top, one or both, formed by bending and folding the pasteboard, as shown and described.

Fig. 8 shows, in section, the completed box, a supplemental cylinder, *b*, being inserted in the usual way to form a neck for the cover. In place of using this supplemental cylinder, a neck may be formed on the base or bottom portion of the box, as represented in Fig. 9. The process and tools by which this neck may be formed do not differ from those usually employed in reducing the ends of metal tubes—as, for example, metallic cartridge cases.

In folding down the wall of the cylinder to form the bottom or top, as above specified, it is recommended that the folds be carried inward, so that after being subjected to pressure, whatever unevenness there is shall be on the inside of the box, leaving the outer surface smooth and plain. This result may be accomplished by a suitable construction of the folding-dies, the corrugations or spines on the face of the dies being made thin and short, and sufficiently prominent for the purpose.

In making paper cartridge cases and shells the end of the tube has been swaged or turned inward, and the end closed, and the head of the cartridge formed by a mass of paper pressed into it, as set forth in the patent to T. J. Powers, May 17, 1870, No. 103,079. The box thus formed may be labeled or ornamented as desired.

A mode of proceeding and tools whereby the box which is the subject of the present invention may be fabricated are above described, but any other may be employed for the purpose which the manufacturer may find to be convenient.

It is not intended to make any claim here for the process or tools, as such, herein described, reserving for a separate application whatever patentable invention there may be in such process and tools.

What is claimed as the invention of TIMOTHY J. POWERS, and for which Letters Patent are desired, is—

1. As a new manufacture, a paper box, the body or cover of which is composed of a hollow cylinder, one end of which, to form the bottom or top, is folded inward and pressed without being cut, and covered with a disk of paper, as described.

2. As a new manufacture, a paper box, the body or cover of which has a projecting flange, *b*, formed without a seam between the body and head or bottom by bending and folding the pasteboard upon itself, as described.

Witness my hand this 13th day of January, 1877.

ANNA POWERS,
*Executrix of T. J. Powers, deceased.*

Witnesses:
B. S. CLARK,
MILLARD F. CLIFTON.